US012145367B2

(12) United States Patent
Miwa

(10) Patent No.: US 12,145,367 B2
(45) Date of Patent: Nov. 19, 2024

(54) LIQUID DISCHARGE HEAD AND LIQUID DISCHARGE APPARATUS

(71) Applicant: Keishi Miwa, Kanagawa (JP)

(72) Inventor: Keishi Miwa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 88 days.

(21) Appl. No.: 17/956,833

(22) Filed: Sep. 30, 2022

(65) Prior Publication Data

US 2023/0130058 A1 Apr. 27, 2023

(30) Foreign Application Priority Data

Oct. 27, 2021 (JP) ................................ 2021-175543

(51) Int. Cl.
*B41J 2/14* (2006.01)

(52) U.S. Cl.
CPC .................................. *B41J 2/1433* (2013.01)

(58) Field of Classification Search
CPC ................. B41J 2/1623; B41J 2/14233; B41J 2002/14362; B41J 2202/20; B41J 2/1433; B41J 2/161; B41J 2202/19; B41J 2/162
See application file for complete search history.

(56) References Cited

U.S. PATENT DOCUMENTS

| | | | |
|---|---|---|---|
| 2015/0171307 A1 | 6/2015 | Masuda et al. |
| 2016/0001556 A1 | 1/2016 | Masuda et al. |
| 2017/0100934 A1 | 4/2017 | Masuda et al. |
| 2019/0275796 A1 | 9/2019 | Miwa |
| 2020/0298569 A1 | 8/2020 | Miwa |
| 2020/0298570 A1 | 9/2020 | Masuda et al. |
| 2021/0016568 A1 | 1/2021 | Miwa |
| 2021/0036208 A1 | 2/2021 | Shimofuku et al. |
| 2021/0162759 A1 | 6/2021 | Miwa et al. |
| 2021/0370675 A1 | 12/2021 | Yoshita et al. |

FOREIGN PATENT DOCUMENTS

| | | |
|---|---|---|
| JP | 2011-056922 | 3/2011 |
| JP | 2011056922 A * | 3/2011 |

* cited by examiner

*Primary Examiner* — Jannelle M Lebron
(74) *Attorney, Agent, or Firm* — XSENSUS LLP

(57) ABSTRACT

A liquid discharge head includes: a nozzle plate having: a nozzle from which a liquid is to be discharged in a liquid discharge direction; and a nozzle face having the nozzle, the nozzle face directed in the liquid discharge direction; a nozzle protector configured to cover a portion of the nozzle face other than the nozzle; and a channel substrate including: a bonding part bonded to the nozzle protector with an adhesive; and a recess in a transverse portion of the bonding part extending in a transverse direction of the liquid discharge head, the recess filled with the adhesive.

7 Claims, 8 Drawing Sheets

COMPARATIVE EXAMPLE

LIQUID DISCHARGE HEAD AND LIQUID DISCHARGE APPARATUS

CROSS-REFERENCE TO RELATED APPLICATIONS

This patent application is based on and claims priority pursuant to 35 U.S.C. § 119 (a) to Japanese Patent Application No. 2021-175543, filed on Oct. 27, 2021, in the Japan Patent Office, the entire disclosure of which is hereby incorporated by reference herein.

BACKGROUND

Technical Field

The present disclosure relates to a liquid discharge head and a liquid discharge apparatus.

Related Art

An inkjet image forming apparatus discharges ink onto a sheet of paper or the like so as to form an image as a liquid discharge apparatus to discharge liquid.

Such inkjet image forming apparatus is provided with a liquid discharge head including a nozzle to discharge ink. Ink is discharged from the nozzle onto the sheet, which has been conveyed to a position where the sheet faces the liquid discharge head, so as to form an image on the sheet. If the sheet comes into contact with the nozzle during the formation of an image, the nozzle may be damaged, leading to an unstable discharge of ink. For this reason, some inkjet image forming apparatus includes a nozzle protector to protect the nozzle.

SUMMARY

A liquid discharge head includes: a nozzle plate having: a nozzle from which a liquid is to be discharged in a liquid discharge direction; and a nozzle face having the nozzle, the nozzle face directed in the liquid discharge direction; a nozzle protector configured to cover a portion of the nozzle face other than the nozzle; and a channel substrate including: a bonding part bonded to the nozzle protector with an adhesive; and a recess in a transverse portion of the bonding part extending in a transverse direction of the liquid discharge bead, the recess filled with the adhesive.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
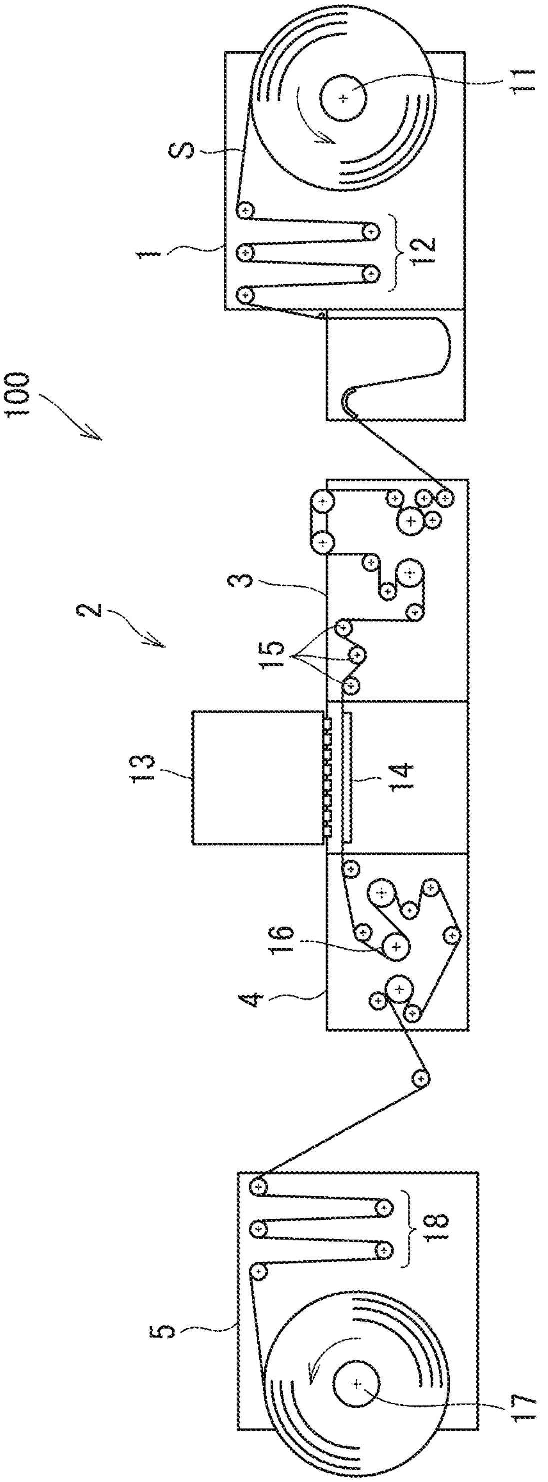
FIG. 1 is a diagram illustrating a general arrangement of an inkjet image forming apparatus according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

In the following, embodiments of the present disclosure are described based on the accompanying drawings. In different drawings for describing the embodiments of the present disclosure, components, such as constituent members and constituent parts, that have the same function or shape are given the same reference sign and no more described after once described as long as the components are recognizable as the same in function or shape.

Figure 2:
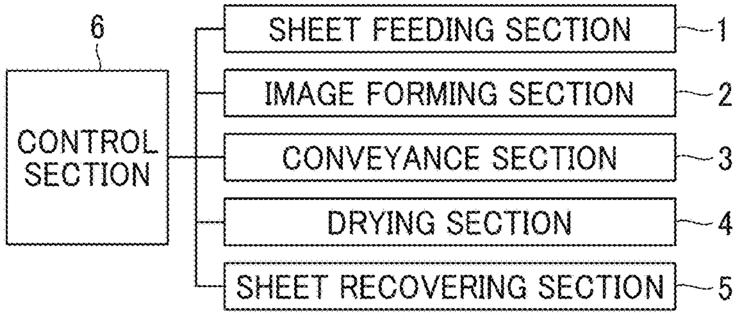
FIG. 2 is a diagram illustrating a control system of the inkjet image forming apparatus according to the embodiment.

First of all, based on FIGS. 1 and 2, a configuration of an inkjet image forming apparatus as an embodiment of a liquid discharge apparatus according to the present disclosure is described. FIG. 1 is a diagram illustrating a general arrangement of the inkjet image forming apparatus, and FIG. 2 is a diagram illustrating a control system of the inkjet image forming apparatus.

As illustrated in FIG. 1, an image forming apparatus 100 (liquid discharge apparatus) according to the present embodiment includes a sheet feeding section 1 that feeds a sheet S for image formation, an image forming section 2 that forms an image on the sheet S, a conveyance section 3 that conveys the sheet S to the image forming section 2, a drying section 4 that dries the sheet S, and a sheet recovering section 5 that recovers the sheet S with an image formed on the sheet S. The image forming apparatus 100 according to the present embodiment also includes a control section 6 (see FIG. 2) for controlling the sheet feeding section 1, the image forming section 2, the conveyance section 3, the drying section 4, and the sheet recovering section 5.

The sheet feeding section 1 includes a feed roller 11 that the sheet S as a lengthened sheet is wound on in a roll form, and a tension adjustment mechanism 12 that adjusts tension applied to the sheet S. The feed roller 11 is rotatable in a direction indicated with an arrow in FIG. 1, and the sheet S is sent out by the rotation of the feed roller 11. The tension adjustment mechanism 12 includes a plurality of rollers that the sheet S is stretched over so as to apply tension to the sheet S. Such rollers are partially moved to adjust the tension on the sheet S, so that the sheet S is sent out from the feed roller 11 under a constant tension.

The image forming section 2 includes a head unit 13 as a liquid discharge unit to discharge a liquid ink onto the sheet S, and a platen 14 as a sheet supporting member to support the sheet S conveyed. The head unit 13 includes a plurality of liquid discharge heads. Based on image data generated by the control section 6, ink is discharged from the liquid discharge heads onto the sheet S so as to form an image on the sheet S. The ink to be discharged is liquid containing a coloring material, a solvent, and particles of a crystallizable resin dispersed in the solvent. The crystallizable resin refers to a resin that undergoes phase change, that is to say, is melted from a crystalline state into liquid if heated to a specified melting point or a higher temperature. The platen 14 is so arranged as to face the head unit 13 and supports a lower face of the sheet S as fed from the sheet feeding section 1. The platen 14 is movable close to and away from the head unit 13 so as to keep the distance between the head unit 13 and the sheet S constant.

The conveyance section 3 includes a plurality of conveyance rollers 15. The sheet S is stretched over the conveyance rollers 15 and as such conveyed to the image forming section 2 by the rotation of each conveyance roller 15. The conveyance section 3 may include another conveyance means such as a conveyance belt.

The drying section 4 includes a beating drum 16 that heats the sheet S in order to promote the drying of the ink on the sheet S. The heating drum 16 is a cylindrical member rotating as the sheet S is wound onto an outer peripheral face of the cylindrical member, and a beat source such as a halogen heater is arranged inside the heating drum 16. Instead of a contact heating means such as the heating drum 16, a noncontact heating means such as a warm air generator that causes warm air to blow the sheet S may be used as a beating means for heating the sheet S.

The sheet recovering section 5 includes a recovery roller 17 that winds up and recovers the sheet S, and a tension adjustment mechanism 18 that adjusts tension applied to the sheet S. The recovery roller 17 is rotatable in a direction indicated with an arrow in FIG. 1, and the sheet S is wound up in a roll form and thus recovered by the rotation of the recovery roller 17. Similarly to the tension adjustment mechanism 12 of the sheet feeding section 1, the tension adjustment mechanism 18 includes a plurality of rollers. The rollers are partially moved to adjust the tension on the sheet S, so that the sheet S is wound up by the recovery roller 17 under a constant tension.

The control section 6 includes an information processing unit such as a personal computer (PC). The control section 6 generates image data on an image to be formed on the sheet S, and controls various operations of the sheet feeding section 1, the image forming section 2, the conveyance section 3, the drying section 4, and the sheet recovering section 5. For instance, the control section 6 controls the rotational speed of the feed roller 11, the recovery roller 17, and the conveyance rollers 15, the temperature of the heat source for heating the heating drum 16, and the like.

Figure 3:
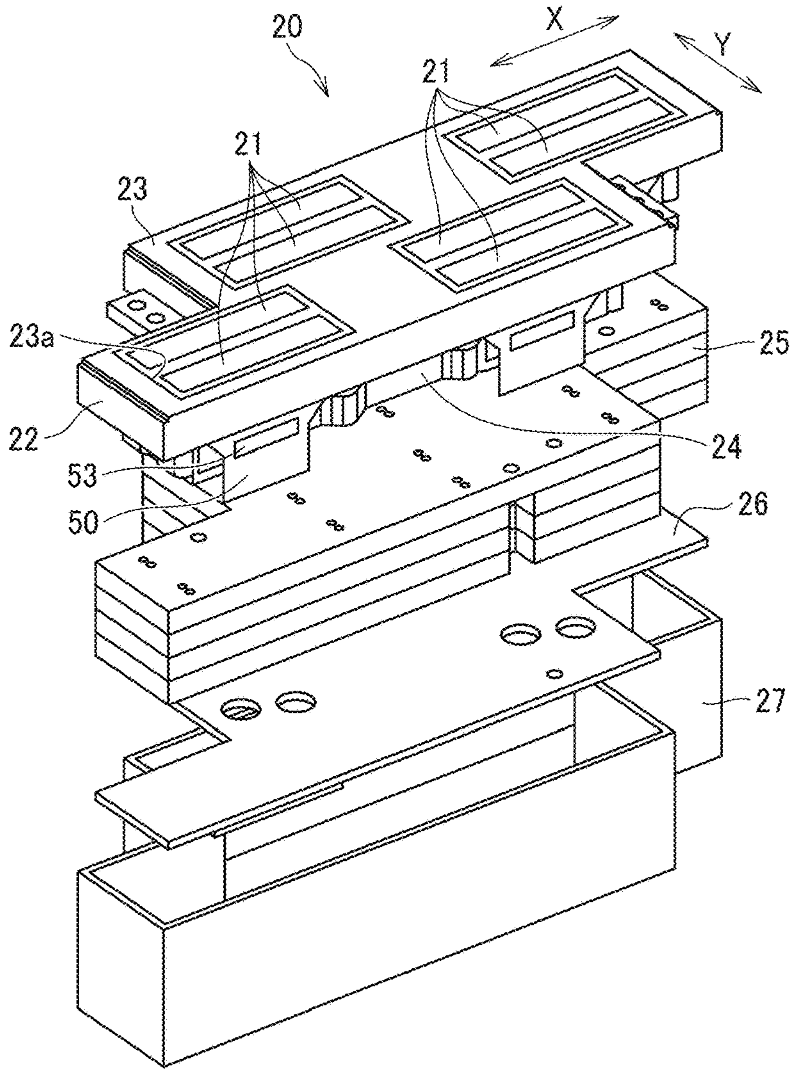
FIG. 3 is an exploded perspective view illustrating an exemplary configuration of a liquid discharge head.
Figure 4:
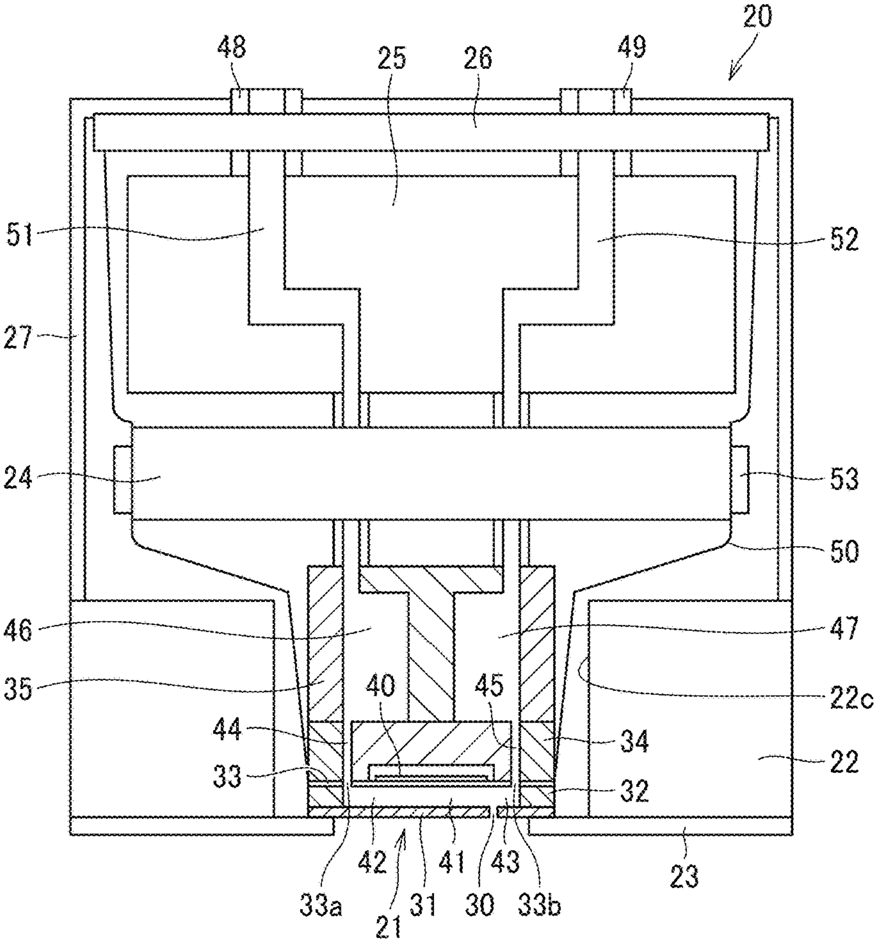
FIG. 4 is a cross-sectional view in a transverse direction of the liquid discharge head illustrated in FIG. 3.

Next, an exemplary configuration of each liquid discharge head is described based on FIGS. 3 and 4.

FIG. 3 is an exploded perspective view of a liquid discharge head. FIG. 4 is a cross-sectional view in a transverse direction (direction indicated with an arrow Y in FIG. 3) of the liquid discharge head illustrated in FIG. 3.

As illustrated in FIG. 3, a liquid discharge head 20 includes a plurality of head bodies 21, a base member 22, a cover 23, a heat releasing member 24, a manifold 25, a printed circuit board 26 (PCB), and a module case 27.

The head bodies 21 are held by the base member 22 as a holding member. In order to fit the head bodies 21 to the base member 22, the head bodies 21 are each initially inserted into an opening 22*c* (see FIG. 4) provided on the base member 22. Then, the head bodies 21 are bonded to the cover 23 as bonded to the base member 22. In the cover 23, holes 23*a* (see FIG. 3) corresponding to the head bodies 21, respectively, are formed, and peripheral portions of the head bodies 21 are bonded to edges of the holes 23*a*. Finally, the head bodies 21 are screwed to the base member 22 and thus secured to the base member 22. Specifically, flange parts of a common channel member 35 (see FIG. 4) are provided on front and back sides in a longitudinal direction (direction orthogonal to the drawing plane of FIG. 4) of each head body 21, and such flange parts are screwed to the base member 22. As a result, the common channel member 35 is held by the base member 22 and the relevant head body 21 is secured. The fitting structure of the head bodies 21 and the base member 22 is not limited to the above structure. The head bodies 21 may be fitted by bonding with an adhesive or by caulking.

As illustrated in FIG. 4, the head body 21 includes a nozzle plate 31 with a nozzle 30 provided on the nozzle plate 31, a channel substrate 32 where an individual liquid chamber 41 leading to the nozzle 30, and the like are formed, a diaphragm 33 including a piezoelectric element 40, a holding board 34 layered on the diaphragm 33, and the common channel member 35 as a frame member layered on the holding board 34. The cover 23 serves as a nozzle protector to protect a nozzle 30 in a nozzle plate 31.

In the channel substrate 32, not only the individual liquid chamber 41 but a supply side individual channel 42 leading to the individual liquid chamber 41 and a collection side individual channel 43 leading to the individual liquid chamber 41 are formed. In the holding board 34, a supply side intermediate individual channel 44 leading to the supply side individual channel 42 through an opening 33*a* of the diaphragm 33 and a collection side intermediate individual channel 45 leading to the collection side individual channel 43 through an opening 33*b* of the diaphragm 33 are formed.

In the common channel member 35 (frame member), a supply side common channel 46 leading to the supply side intermediate individual channel 44 and a collection side common channel 47 leading to the collection side intermediate individual channel 45 are formed. The supply side common channel 46 leads to a supply port 48 through a channel 51 of the manifold 25. The collection side common channel 47 leads to a collection port 49 through another channel 52 of the manifold 25.

The printed circuit board 26 and the piezoelectric element 40 of the head body 21 are connected to each other through a flexible wiring member 50. On the flexible wiring member 50, a driver integrated circuit 53 (driver IC) is mounted.

The base member 22 is preferably made of a material with a low coefficient of linear expansion. Examples of the material with a low coefficient of linear expansion include 42 Alloy and an Invar material (FeNi36) each obtained by adding nickel to iron. If the base member 22 is made of such material, the amount of expansion of the base member 22 is small even if the temperature of the base member 22 rises due to the heat generation of the liquid discharge head 20, so that the nozzle 30 is hardly displaced and the discharge of ink is prevented from getting out of position. If the nozzle plate 31 and the diaphragm 33 are each formed of a silicon single crystal substrate and made to have a coefficient of linear expansion substantially equal to the coefficient of linear expansion of the base member 22, the displacement of the nozzle 30 due to thermal expansion is reduced still further.

Figure 5:
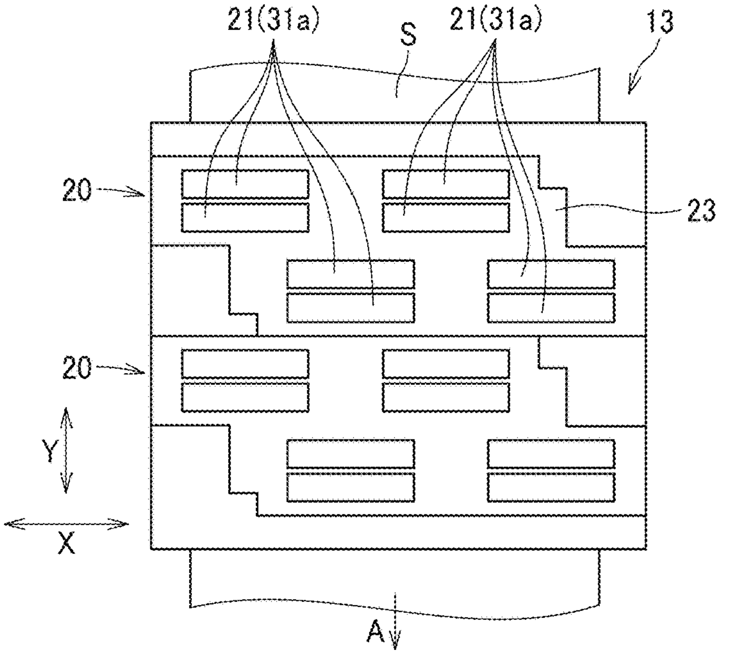
FIG. 5 is a plan view illustrating an exemplary configuration of a line head unit.

FIG. 5 is a plan view illustrating an exemplary configuration of the head unit 13.

In the example illustrated in FIG. 5, the head unit 13 includes two liquid discharge heads 20. Each liquid discharge head 20 is arranged so that a transverse direction (direction indicated with an arrow Y in the figure) of the relevant liquid discharge head 20 may agree with a sheet conveyance direction A and a longitudinal direction (direction indicated with an arrow X in the figure) of the relevant liquid discharge head 20 may agree with a direction orthogonal to the sheet conveyance direction A. As illustrated in FIG. 5, the longitudinal direction of the liquid discharge head 20 refers to the longitudinal direction (direction indicated with the arrow X) of the liquid discharge bead 20, which extends in one direction as viewed from a direction orthogonal to a nozzle face 31*a* where the nozzle 30 (see FIG. 4) is exposed. The transverse direction of the liquid discharge head 20 refers to a direction (indicated with the arrow Y) orthogonal to the longitudinal direction of the liquid discharge head 20 as viewed from the direction orthogonal to the nozzle face 31*a*. In the following description, the longitudinal direction and the transverse direction of the liquid discharge head 20 bare the same meanings as the above.

The head unit 13 illustrated in FIG. 5 is a so-called line head unit. When the sheet S is conveyed to a position where the sheet S faces the head unit 13, ink is discharged from the nozzle 30 of each head body 21 without moving the head unit 13 with respect to the sheet S conveyed, so as to form an image on the sheet S.

Besides such line head unit, a so-called serial head unit that discharges ink while moving a liquid discharge head in a main scanning direction (sheet width direction) is usable as the head unit 13.

Figure 6:
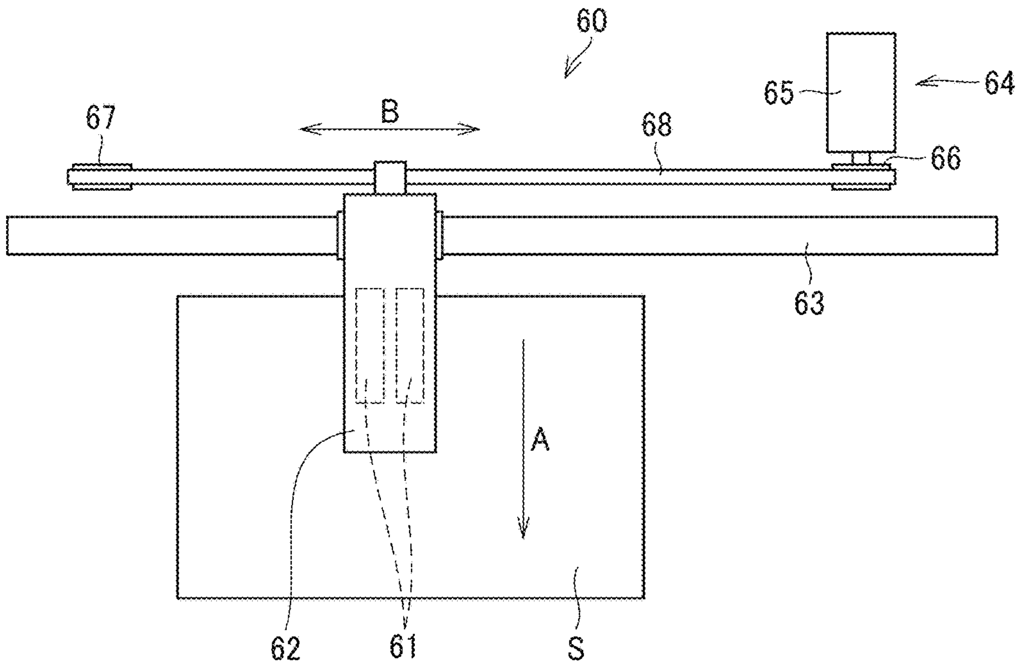
FIG. 6 is a plan view illustrating an exemplary configuration of a serial head unit.

FIG. 6 is a diagram illustrating an exemplary configuration of a serial head unit 60. As illustrated in FIG. 6, the serial head unit 60 includes a carriage 62 where a liquid discharge head 61 is mounted, a guide 63 (guide rod) for guiding the carriage 62 in a main scanning direction, namely, a sheet width direction B, and a drive unit 64 that moves the carriage 62.

The drive unit 64 includes, for instance, a motor 65 as a driving source and a timing belt 68 put over a driving pulley 66 and a driven pulley 67. If the driving pulley 66 is driven to rotate by the motor 65, the timing belt 68 circles so as to move the carriage 62 along the guide 63 in the main scanning direction. The direction of rotation of the motor 65 is changed from one direction to the counter direction so as to subject the carriage 62 to the reciprocation in the main scanning direction.

In the serial head unit 60 as above, the carriage 62 is moved in the main scanning direction and, at the same time, ink is discharged from the liquid discharge head 61 according to an image signal, so as to form an image for one line on the sheet S being stopped. The sheet S is moved a specified amount at a time in a direction indicated with an arrow A in FIG. 6, and the reciprocation of the carriage 62 and the discharge of ink are repeated so as to sequentially form images on the sheet S.

The temperature of a bead unit (liquid discharge head) may greatly change depending on a thermal environment during the transport of products, for instance. If members included in the head unit are expanded or contracted attending the temperature change of the head unit, the difference in coefficient of linear expansion between the members causes strain to arise at and load to be put on a bonding spot between the members.

In particular, a large load is put on the cover 23, so that the cover 23 will peel off if a bonding spot of the cover 23 cannot endure such load. If the cover 23 peels off and a foreign body such as ink happens to break into the head body 21 through the spot of peeling off of the cover 23, a breakdown or a malfunction is caused by the foreign body.

If ink breaks in through the spot of peeling off of the cover 23 and adheres to a conductive part such as the flexible wiring member 50 (see FIG. 4) in the head body 21, for instance, a breakdown due to an electric leakage may be caused.

If the breaking-in ink adheres to the piezoelectric element 40 (see FIG. 4) in the head body 21, the ink, which solidifies afterward, prevents a suitable driving of the piezoelectric element 40, which may lead to a poor discharge of ink.

Thus, the peeling off of the cover 23 causes various disadvantages including malfunctions and breakdowns. For this reason, in the embodiments of the present disclosure, the configurations as described below are adopted.

Figure 7:
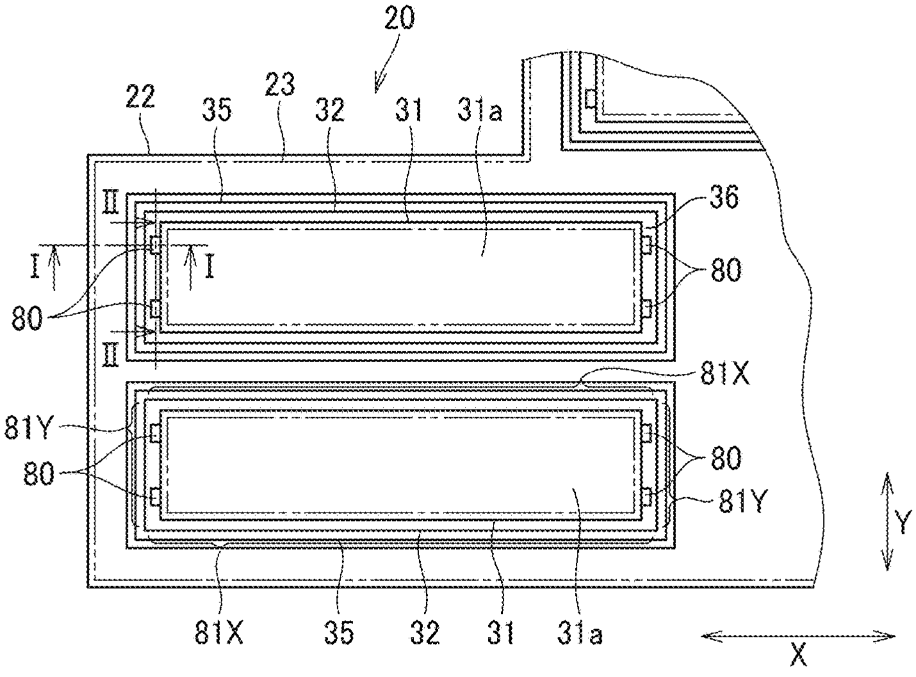
FIG. 7 is a plan view illustrating a state where a cover of a liquid discharge head according to a first embodiment of the present disclosure has been removed.
Figure 8:
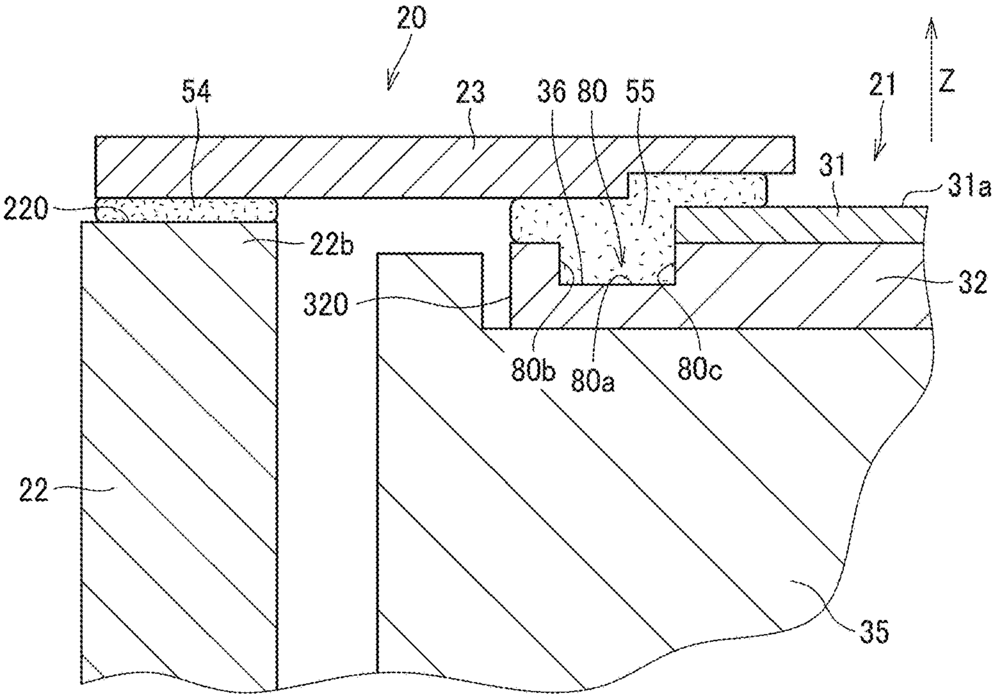
FIG. 8 is a cross-sectional view taken along a line I-I in FIG. 7.
Figure 9:
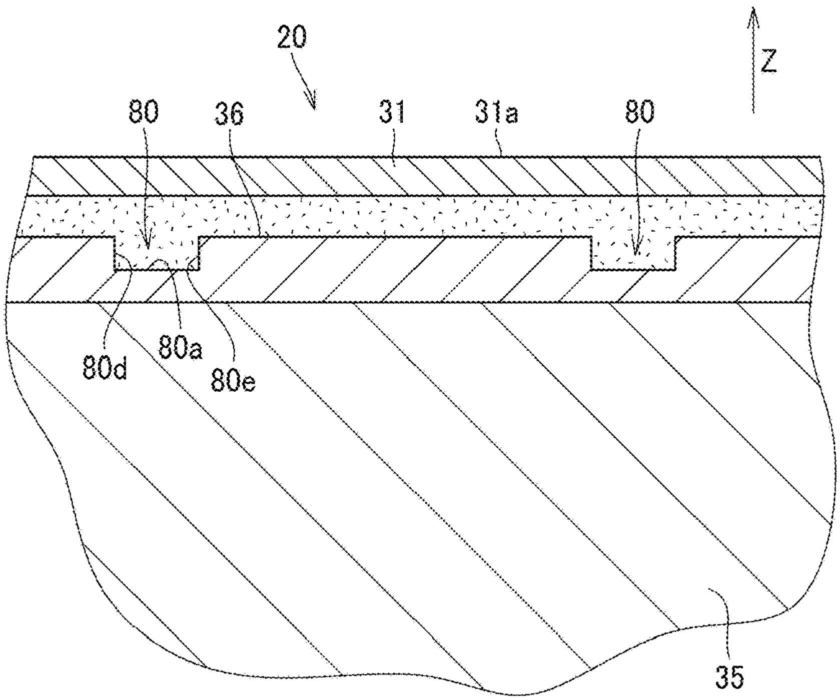
FIG. 9 is a cross-sectional view taken along a line II-II in FIG. 7.

FIG. 7 is a plan view illustrating a state where a cover of a liquid discharge head according to a first embodiment of the present disclosure has been removed, FIG. 8 is a cross-sectional view taken along a line I-I in FIG. 7, and FIG. 9 is a cross-sectional view taken along a line II-II in FIG. 7. The liquid discharge head according to the present embodiment is substantially the same in basic structure as the liquid discharge head illustrated in FIGS. 3 and 4, so that the description on the parts as already described is appropriately omitted.

As illustrated in FIGS. 7 through 9, a liquid discharge head 20 according to the present embodiment includes the nozzle plate 31 with the nozzle 30 (see FIG. 4) provided on the nozzle plate 31, the cover 23 as a nozzle protector, which protects the nozzle 30, the channel substrate 32 as a channel forming member, in which the supply side individual channel 42 (see FIG. 4), the collection side individual channel 43 (see FIG. 4), and the like are formed, the common channel member 35 as a frame member, and the base member 22 as a holding member, which holds the common channel member 35 and the like.

In FIG. 7, an arrow X indicates a longitudinal direction of the liquid discharge head 20, and an arrow Y indicates a transverse direction of the liquid discharge head 20. In FIGS. 8 and 9, an arrow Z indicates a liquid discharge direction where liquid (ink) is discharged from the nozzle 30 of the nozzle plate 31. In other words, in FIGS. 8 and 9, the nozzle face 31*a* of the nozzle plate 31, at which the nozzle 30 is exposed, is directed upward.

The cover 23 covers at least a portion of the nozzle face 31*a* other than a portion where the nozzle 30 is arranged. In the present embodiment, the cover 23 covers an edge portion of the nozzle face 31*a* and the vicinity of the edge portion.

When a center side (the right side in FIG. 8) of the nozzle face 31*a* is assumed as the inside and the side (the left side in FIG. 8) opposite to the center side is assumed as the outside, a portion on the outside of the cover 23 is bonded to the base member 22 through an adhesive 54, as illustrated in FIG. 8. The base member 22 is arranged around the nozzle plate 31, the channel substrate 32, and the common channel member 35, and the portion on the outside of the cover 23 is bonded to a face 220 of the base member 22 that is directed in a liquid discharge direction Z.

On the other hand, a portion on the inside of the cover 23 is bonded to the nozzle plate 31 and the channel substrate 32 through an adhesive 55. The channel substrate 32 is arranged on a face opposite with the nozzle face 31*a* of the nozzle plate 31 (a lower face of the nozzle plate 31 in FIG. 8), and a portion of the channel substrate 32 protrudes from an edge portion of the nozzle plate 31 toward the outside. The cover 23 is bonded to the portion of the channel substrate 32 protruding toward the outside and the periphery of the edge portion of the nozzle plate 31.

The portions on the inside and the outside of the cover 23 are bonded to the different members through the adhesives 54 and 55, respectively, and a space between the different members on one hand and the cover 23 on the other is sealed with the adhesives 54 and 55, so that any foreign bodies including ink are prevented from breaking in through the space. If, however, various members in the liquid discharge head 20 are expanded or contracted attending the temperature change, load is put on the bonding spot of the cover 23 and the cover 23 may peel off, as described above.

In order to cope with such disadvantage, in the present embodiment, a plurality of recesses 80 are provided on the channel substrate 32 as a bonding member, to which the cover 23 is bonded, as illustrated in FIG. 7.

Each recess 80 is provided in a bonding part 36 to be bonded to the cover 23 (the portion protruding from the nozzle plate 31 toward the outside) of the channel substrate 32.

As illustrated in FIGS. 8 and 9, the recess 80 in the present embodiment is formed in the shape of a cube or rectangular parallelepiped having a bottom face 80*a* and four side faces 80*b* through 80*e* orthogonal to the bottom face 80*a*, and opens in the liquid discharge direction Z. The "orthogonal" includes at least one of the side faces 80*b* through 80*e* slightly tilted with respect to the plane orthogonal (vertical) to the bottom face 80*a*.

The bonding part 36 of the channel substrate 32 is a flat bonding part 36 (bonding face) except for a portion with the recess 80.

In the present embodiment, the recesses 80 are provided in the bonding part 36 of the channel substrate 32, so that the adhesive 55 applied to the bonding part 36 of the channel substrate 32 comes into the recesses 80 and the recesses 80 are filled with the adhesive 55, as illustrated in FIGS. 8 and 9. The adhesive 55 is applied not only to the portion with the recess 80 but other portions (the flat bonding part 36) of the channel substrate 32, and the adhesives 54 and 55 are applied to bonding part 36*s* of the base member 22 and the nozzle plate 31, respectively. Then, the cover 23 is pressed onto the adhesives 54 and 55 before the adhesives 54 and 55 are cured so as to bond the cover 23 to the different members (the channel substrate 32, the nozzle plate 31, and the base member 22).

At a spot where the recess 80 is provided, in particular, the adhesive 55 is cured in the recess 80 so as to achieve an anchoring effect. In other words, the adhesive 55 is cured in the state of coming in the recess 80, so that the bonding force is increased as compared with the case where flat faces are bonded to each other. Consequently, in the present embodiment, the bonding force between the cover 23 and the channel substrate 32 is improved and the cover 23 is less liable to peel off as compared with a configuration where no recesses are provided in a bonding part 36.

Figure 14:
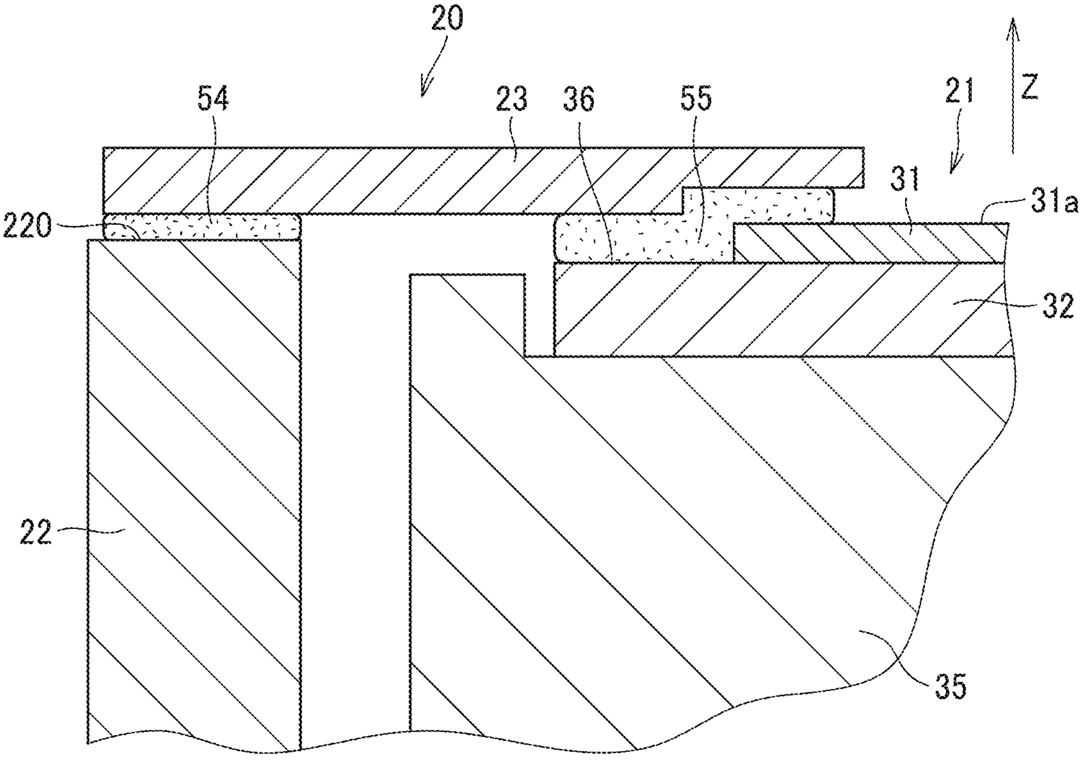
FIG. 14 is a schematic cross-sectional view of a liquid discharge head according to a comparative example.

In order to confirm the improvement of the bonding force owing to the above anchoring effect, a bonding force evaluation test was performed on the configuration according to the present embodiment and a configuration of a comparative example illustrated in FIG. 14.

The comparative example is the same in configuration as the present embodiment except that the recess 80 is not provided in the bonding part 36 of the channel substrate 32. The respective liquid discharge heads according to the comparative example and the present embodiment were each subjected to the temperature change in the range of 30° C. to 70° C., and such temperature change cycle was performed ten times so as to check whether the cover 23 peeled off.

As a result, in half the comparative example specimens, the cover 23 peeled off. In the rest of the comparative example specimens, the cover 23 did not peel off indeed, but a bonded state of the cover 23 was barely maintained. In contrast, the cover 23 peeled off in none of the present embodiment specimens. It has thus been confirmed that the peeling off of the cover 23 is effectively suppressed according to the configuration of the present embodiment.

In the present embodiment, the adhesive 55 is applied over the entire periphery (the whole bonding part 36) of the channel substrate 32, while the recesses 80 are only provided in a portion 81Y of the bonding part 36 of the channel substrate 32 that extends in the transverse direction of the liquid discharge head 20 (see FIG. 7). The recesses 80 are provided not over the whole bonding part 36 but only in the portion 81Y extending in the transverse direction because a large load is put on the portion 81Y in particular.

A test for checking the stress change attendant upon the temperature change was performed in advance on a liquid discharge head formed in a longitudinal shape, as is the case with the present embodiment. As a result, it has been found that a large load occurs especially in a portion extending in a transverse direction of the liquid discharge head. It is estimated from the above that, of the bonding part 36 extending over the entire periphery of the channel substrate 32, the portion 81Y extending in the transverse direction, in particular, is a portion where the cover 23 is liable to peel off. Therefore, in the present embodiment, the recesses 80 are provided in the portion 81Y extending in the transverse direction of the bonding part 36 of the channel substrate 32, which is a portion where the cover 23 is especially liable to peel off. Such configuration allows the bonding force in the portion 81Y extending in the transverse direction to be improved by the anchoring effect of the adhesive 5S filled into the recesses 80, so that the peeling off of the cover 23 is effectively suppressed.

In a portion 81X of the bonding part 36 of the channel substrate 32 that extends in the longitudinal direction of the liquid discharge head 20, the recesses 80 are not provided (see FIG. 7). In other words, the portion 81X extending in the longitudinal direction gives a flat bonding face without the recesses 80 overall. The recesses 80 are not provided in the portion 81X extending in the longitudinal direction of the bonding part 36 of the channel substrate 32 in order to improve the sealing performance with an adhesive.

Generally speaking, a bonding part 36 with a recess is liable to cause air bubbles to get mixed in or a gap to be generated during the application of an adhesive, as compared with a flat bonding part 36 (bonding face). On the other hand, in such a configuration as the configuration of the present embodiment, in which the cover 23 is bonded to the channel substrate 32, an adhesive needs to be applied thick so as to reduce a pressurizing force exerted on the channel substrate 32 during the bonding of the cover 23 so that the channel substrate 32 may not be damaged by the pressurizing force.

In the present embodiment, it is thus desirable to use an adhesive with a somewhat high viscosity, but the adhesive with a high viscosity is even harder to fill into the recess 80, which increases the possibility that air bubbles or a gap is generated. Certain adhesives are less liable to generate air bubbles or a gap indeed, but such adhesives are limited in variety, so that the range of adhesive selection is inevitably restricted if any such adhesive is to be used.

While the recess 80 is hard to fill with an adhesive and an adhesive with a high viscosity in particular increases the possibility that air bubbles or a gap is generated, a portion where the recess 80 is to be provided is limited to the portion 81Y extending in the transverse direction of the bonding part 36 as described above, so as to reduce the possibility that air bubbles or a gap is generated. In other words, the recess 80, in which air bubbles or a gap is liable to be generated, is limitedly provided in a desirable minimum region, so that air bubbles or a gap is less liable to be generated between bonding parts 36, which improves the sealing performance.

According to the present embodiment, the sealing performance is ensured between the cover 23 and the channel substrate 32 even if an adhesive less liable to generate air bubbles or a gap in the recess 80 is not selected as an adhesive for bonding the cover 23 and the channel substrate 32 together. Consequently, the range of adhesive selection is widened, and the disadvantage of restricting the range of adhesive selection is ameliorated. In addition, if the recesses 80 are limitedly provided as in the present embodiment, the amount of an adhesive required to fill up the recesses 80 is small and, accordingly, cost reduction is expected as compared with the case where the recesses 80 are provided over the whole bonding part 36.

According to the present embodiment, the recesses 80 are provided exclusively in the portion 81Y extending in the transverse direction, on which a large load is put in particular, so that an improved bonding force and an ensured sealing performance are both achieved. Consequently, the break in of foreign bodies into the liquid discharge head 20 is effectively suppressed and the possibility of malfunction and breakdown of the liquid discharge head 20 is reduced, leading to an improved reliability. The recesses 80 may be provided not only in the portion 81Y extending in the transverse direction but along part of the portion 81X extending in the longitudinal direction, as long as the recesses 80 are not provided over the entire periphery of the channel substrate 32. Even in that case, the sealing performance is improved as compared with the case where the recesses 80 are provided over the entire periphery of the channel substrate 32.

While the recesses 80 can be provided over the whole portion 81Y extending in the transverse direction, it is preferable for the improvement in sealing performance that the recesses 80 are provided in part of the portion 81Y extending in the transverse direction, as illustrated in FIG. 7. The number of the recesses 80 provided for each portion 81Y extending in the transverse direction is not limited to two (see FIG. 7) but may be one, three or larger. As viewed from the liquid discharge direction Z, the recesses 80 are rectangular in shape, while the recesses 80 may have a circular shape or another shape.

Next, embodiments each different from the embodiment (first embodiment) as above are described. The following description is chiefly made on parts different from the parts in the above embodiment, and description on the other parts, which are basically the same in configuration as the parts in the above embodiment, is omitted as appropriate.

Figure 10:
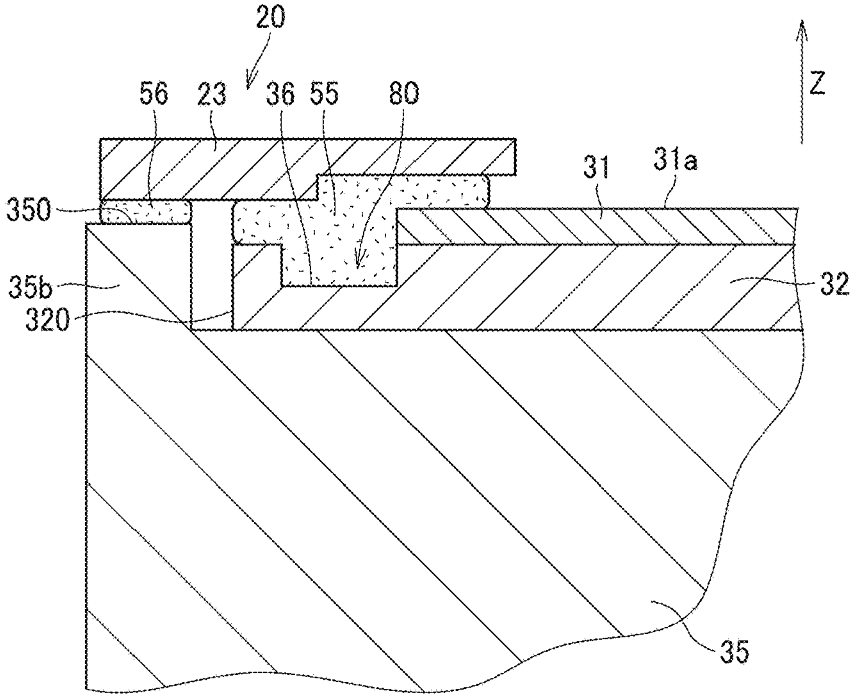
FIG. 10 is a schematic cross-sectional view of a liquid discharge head according to a second embodiment of the present disclosure.

FIG. 10 is a schematic cross-sectional view of a liquid discharge head according to a second embodiment of the present disclosure.

In the second embodiment illustrated in FIG. 10, the base member 22 (see FIG. 8) is not provided. The cover 23 in the present embodiment is bonded to the common channel member 35 (frame member) instead of the base member 22. Specifically, the common channel member 35 has a peripheral wall part 35*b* that is arranged on the periphery (the outside) of the nozzle plate 31 and the channel substrate 32 and protrudes in the liquid discharge direction Z, and the cover 23 is bonded to a face 350 directed in the liquid discharge direction Z of the peripheral wall part 35*b* with an adhesive 56. In the embodiment (first embodiment) illustrated in FIG. 8, a portion upper in the figure of the base member 22 corresponds to a peripheral wall part 22*b* arranged on the periphery of the nozzle plate 31 and the channel substrate 32.

The second embodiment is different from the above embodiment in that the base member 22 is not provided and the cover 23 is bonded to the peripheral wall part 35*b* of the common channel member 35, and in such configuration also, the cover 23 may peel off if the different members are expanded or contracted attending the temperature change of the liquid discharge head 20.

Therefore, in the present embodiment, similarly to the above embodiment, the recesses 80 are only provided in the portion 81Y (see FIG. 7) extending in the transverse direction of the liquid discharge bead 20 of the bonding part 36 of the channel substrate 32, to which the cover 23 is bonded. As a result, similarly to the above embodiment, an improved bonding force and an ensured sealing performance are both achieved and the break in of foreign bodies into the liquid discharge head 20 is effectively suppressed, so that the reliability is improved.

Figure 11:
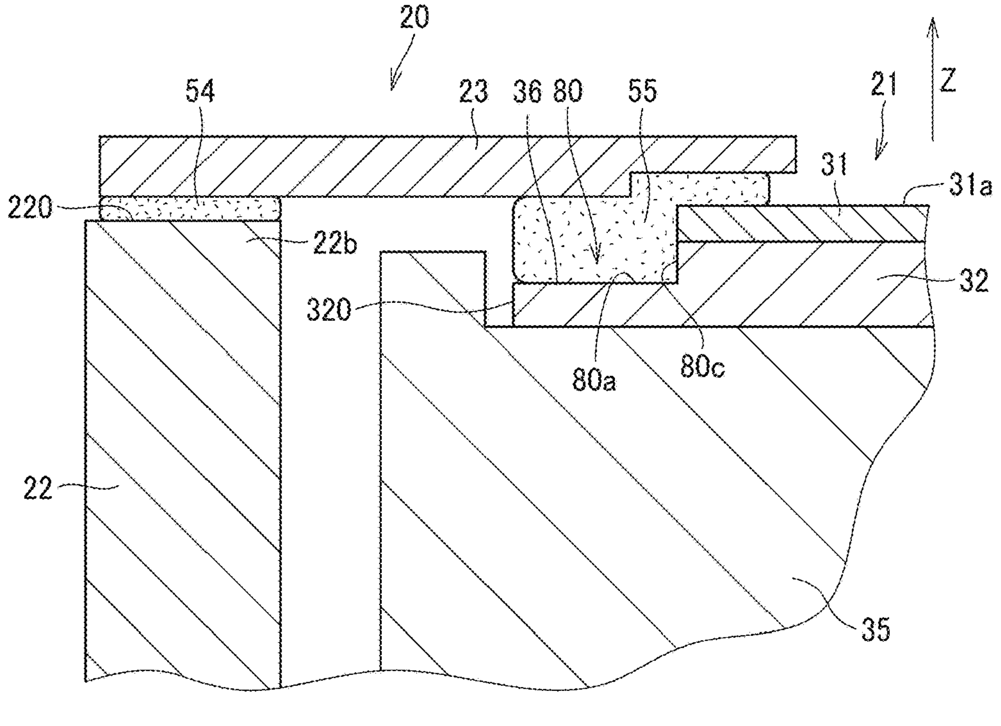
FIG. 11 is a schematic cross-sectional view of a liquid discharge head according to a third embodiment of the present disclosure.

FIG. 11 is a schematic cross-sectional view of a liquid discharge head according to a third embodiment of the present disclosure.

In the third embodiment illustrated in FIG. 11, the recess 80 opens at an end face 320 directed to the outside (side opposite to a nozzle face center side) of the channel substrate 32. In other words, the recess 80 in the present embodiment does not have the side face 80*b* (see FIG. 8) of the recess 80 in the above first embodiment, which is arranged on the outside.

In the third embodiment, the recess 80 opens toward the outside of the channel substrate 32, so that air bubbles in the recess 80 are easily ejected toward the outside through an opening. Consequently, the recess 80 is ready to fill with the adhesive 55, which improves the sealing performance with the adhesive 55 still further. The configuration of the present embodiment, in which the recess 80 opens toward the outside of the channel substrate 32, is applicable not only to the liquid discharge head 20 including the base member 22, such as illustrated in FIG. 11, but the liquid discharge head 20 not including the base member 22 (see FIG. 10).

Figure 12:
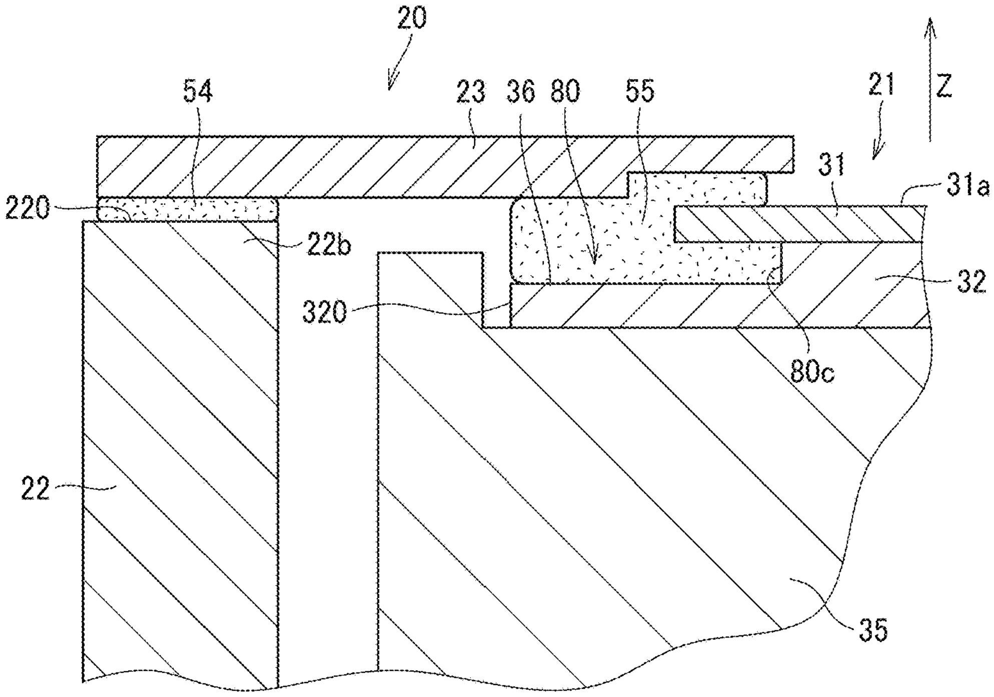
FIG. 12 is a schematic cross-sectional view of a liquid discharge head according to a fourth embodiment of the present disclosure.

FIG. 12 is a schematic cross-sectional view of a liquid discharge head according to a fourth embodiment of the present disclosure.

In the fourth embodiment illustrated in FIG. 12, the configuration of the third embodiment illustrated in FIG. 11 is reproduced and, moreover, the recess 80 is enlarged toward the inside so that the recess 80 may partially extend on a side of the nozzle plate 31 opposite to the nozzle face 31*a* side (a lower side of the nozzle plate 31 in FIG. 12). In other words, part of the recess 80 is so arranged as to overlap the nozzle plate 31, as viewed from the direction orthogonal to the nozzle face 31*a*.

Thus, in the fourth embodiment, part of the recess 80 is so arranged as to overlap the nozzle plate 31, so that the adhesive 55, which is filled into the recess 80, spreads on the side of the nozzle plate 31 opposite to the nozzle face 31*a* side so as to get under the nozzle plate 31. The adhesive 55 is cured while staying under the nozzle plate 31, which enhances the anchoring effect of the adhesive 55 still further, and further improves the bonding force between the cover 23 and the channel substrate 32.

Consequently, in the present embodiment, the peeling off of the cover 23 is suppressed more effectively and the reliability is improved. On the other hand, such a configuration as illustrated in FIGS. 7 through 9, FIG. 10 or FIG. 11 where the recess 80 does not overlap the nozzle plate 31 is advantageous in that the recess 80 is formed in the channel substrate 32 even after the nozzle plate 31 is attached onto the channel substrate 32.

The configuration of the present embodiment, in which part of the recess 80 overlaps the nozzle plate 31, is applicable not only to the liquid discharge head 20 including the base member 22, such as illustrated in FIG. 12, but the liquid discharge head 20 not including the base member 22 (see FIG. 10) and a configuration where the recess 80 does not open toward the outside (see FIGS. 7 through 9 and FIG. 10) as well.

Figure 13:
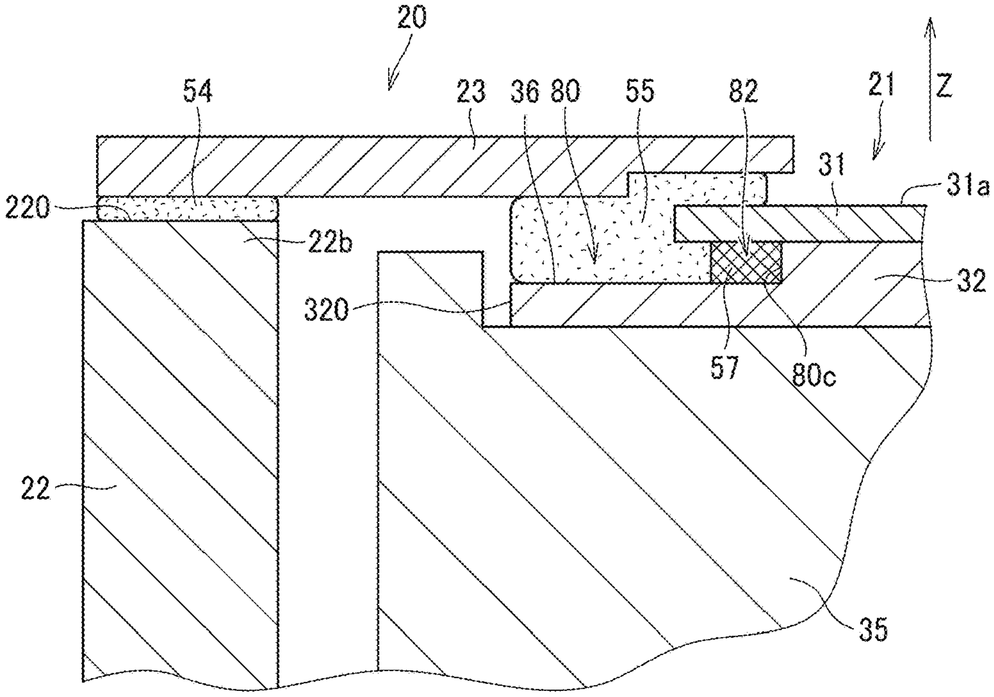
FIG. 13 is a schematic cross-sectional view of a liquid discharge head according to a fifth embodiment of the present disclosure.

FIG. 13 is a schematic cross-sectional view of a liquid discharge head according to a fifth embodiment of the present disclosure.

In the fifth embodiment illustrated in FIG. 13, the configuration of the fourth embodiment illustrated in FIG. 12 is reproduced and, moreover, part of the recess 80 is formed as a temporary bonding recess 82. The temporary bonding recess 82 is a recess to be filled with an adhesive 57 for temporarily bonding the nozzle plate 31 and the channel substrate 32 together. The recess 80 and the temporary bonding recess 82 are arranged so that one recess 80 and one temporary bonding recess 82 may be provided at each end of the portion 81Y extending in the transverse direction, for instance. The number and arrangement of the recess 80 and the temporary bonding recess 82, however, are changeable as appropriate.

As described above, part of the recess 80 may be used as the temporary bonding recess 82. In order to bond the cover 23 in the present embodiment, the temporary bonding recess 82 is initially filled with the adhesive 57 for temporary bonding so as to temporarily bonding the nozzle plate 31 and the channel substrate 32 to each other. The adhesive 57 for temporary bonding is preferably an ultraviolet curable adhesive that is easy to cure, for instance.

To the nozzle plate 31 and the channel substrate 32 (the recess 80) as temporarily bonded together, the adhesive 55 for regular bonding is applied so as to bond the cover 23 to the nozzle plate 31 and the channel substrate 32. The nozzle plate 31 and the channel substrate 32 are temporarily bonded to each other before the cover 23 is subjected to the regular bonding to the nozzle plate 31 and the channel substrate 32 as bonded together, which facilitates the positioning of such different members with respect to one another.

The configuration, in which part of the recess 80 is used as the temporary bonding recess 82, is applicable not only to the liquid discharge head 20 including the base member 22, such as illustrated in FIG. 13, but the liquid discharge head 20 not including the base member 22 (see FIG. 10) and the configuration where the recess 80 does not open toward the outside (see FIGS. 7 through 9) and FIG. 10) as well.

The embodiments of the present disclosure have been described above, while the present disclosure is not limited to the above embodiments, and any appropriate design variations are possible without departing from the subject matter of the invention.

In the present disclosure, the liquid discharge head refers to an operating part to discharge or inject liquid through a nozzle. The liquid to be discharged is not particularly limited as long as the liquid has a viscosity or surface tension allowing the discharge of the liquid from the liquid discharge head. Preferably, the liquid to be discharged has a viscosity of 30 mPa's or less at normal temperature and pressure or after being heated or cooled.

Specific examples of the liquid include a solution, suspension, emulsion or the like containing a solvent such as water and an organic solvent, a colorant such as a dye and a pigment, a polymerizable compound, a resin, a functionality imparting material such as a surfactant, a biocompatible material such as a deoxyribonucleic acid (DNA), an amino acid or a protein, and calcium, or an edible material such as a natural coloring matter. Such liquid is used as, for instance, an inkjet ink, a surface treatment liquid, a liquid for the formation of a component or circuitry resist pattern of an electronic device or a light emitting device, or an ingredient liquid for three-dimensional modeling.

The liquid discharge head may include a plurality of head bodies, as is the case with the above embodiments, or include a single head body.

Examples of an energy source usable for the discharge of liquid include a piezoelectric actuator, such as a multilayer piezoelectric element and a thin-film piezoelectric element, a thermal actuator using a thermoelectric conversion element such as a heat generating resistor, and an electrostatic actuator including a diaphragm and a counter electrode.

In the present disclosure, the liquid discharge unit includes an operating part or a mechanism that is integrated with the liquid discharge head, that is to say, the liquid discharge unit includes an aggregate of parts related to the discharge of liquid.

Examples of the liquid discharge unit include a liquid discharge unit including at least one among a head tank, a carriage, a supply mechanism, a maintenance mechanism, a main scanning movement mechanism, and a liquid circulation device, as a combination with the liquid discharge head.

Examples of such integrated configuration include the configuration, in which the liquid discharge head and the operating part or the mechanism are secured to each other through fastening, bonding, engagement or the like, and the configuration, in which either of the liquid discharge head and the operating part or the mechanism is held movably with respect to the other.

Besides, the liquid discharge head and the operating part or the mechanism may be formed detachably from each other.

In an exemplary liquid discharge unit, a liquid discharge head and a head tank are integrated with each other.

In another exemplary liquid discharge unit, a liquid discharge head and a head tank are coupled to each other through a tube or the like so as to integrate the liquid discharge head and the head tank with each other. In such liquid discharge units, a unit including a filter may be added between the head tank and the liquid discharge head.

In another exemplary liquid discharge unit, a liquid discharge head and a carriage are integrated with each other.

In another exemplary liquid discharge unit, a liquid discharge head is movably held by a guide forming part of a scanning movement mechanism, so as to integrate the liquid discharge head and the scanning movement mechanism with each other.

In another exemplary liquid discharge unit, a liquid discharge head, a carriage, and a main scanning movement mechanism are integrated with one another.

In another exemplary liquid discharge unit, a cap member forming part of a maintenance mechanism is secured to a carriage that a liquid discharge head is fitted to, so as to integrate the liquid discharge head, the carriage, and the maintenance mechanism with one another.

In another exemplary liquid discharge unit, a tube is coupled to a liquid discharge head that a head tank or a channel part is fitted to, so as to integrate the liquid discharge head and a supply mechanism with each other. Through the tube, liquid is fed from a liquid source retaining the liquid to the liquid discharge head.

The main scanning movement mechanism is assumed to include a single guide. The supply mechanism is assumed to include a single tube and a single charging part.

Examples of the liquid discharge apparatus include an apparatus that includes a liquid discharge head or a liquid discharge unit and drives the liquid discharge head so as to cause the liquid discharge head to discharge liquid.

In addition, examples of the liquid discharge apparatus include not only an apparatus to discharge liquid to an object where the liquid is adherable but an apparatus to discharge liquid into a gas or liquid.

The liquid discharge apparatus can include a means concerning the feed, conveyance or ejection of an object where liquid is adherable, a preprocessing device, a post-processing device, and the like.

Thus, the liquid discharge apparatus is exemplified by an image forming apparatus to discharge ink so as to form an image on a sheet of paper, and a stereo-modeling apparatus (three-dimensional modeling apparatus) to discharge a modeling liquid to a powder bed obtained by forming powder into layered stuff, in order to produce a stereo-modeled product (three-dimensionally modeled product).

The liquid discharge apparatus is not limited to an apparatus that allows a meaningful image of a character, a figure or the like to be visualized with the liquid as discharged.

An exemplary liquid discharge apparatus may form a pattern that has no meaning in itself or a three-dimensional image.

The above-mentioned object where liquid is adherable refers to an object to be conveyed where liquid is adherable at least temporarily, with examples of such object including an object that the adhered liquid is firmly fixed to and an object that the adhered liquid permeates.

Specific examples include a sheet such as a sheet of paper, a recording paper, a recording sheet, a film, and a sheet of cloth, an electronic component such as an electronic board and a piezoelectric element, and such media as a powder bed (powder layer), an organ model, and a cell for examination, and any such objects are included unless the object where liquid is adherable is particularly limited.

The object where liquid is adherable may be made of such a material as paper, thread, fiber, cloth, leather, metal, plastics, glass, wood or ceramics, as long as liquid is adherable to the material even temporarily.

The sheet may be a lengthened continuous sheet such as a rolled paper or a sheet so cut in advance as to have a specified size such as a cut paper.

The present disclosure is also applicable to an apparatus that conveys an object to be conveyed other than the sheet.

The liquid discharge apparatus may be an apparatus that relatively moves a liquid discharge head and an object where liquid is adherable, to which apparatus the liquid discharge apparatus is not limited.

Specifically, the liquid discharge apparatus may also be a serial type apparatus (see FIG. 6) that moves the liquid discharge head or a line type apparatus (see FIG. 5) that does not move the liquid discharge head.

The liquid discharge apparatus is further exemplified by a treatment liquid application apparatus to discharge a treatment liquid to a sheet of paper in order to apply the treatment liquid onto a surface of the sheet for the purpose of surface modification of the sheet or other purpose, and a jet granulation apparatus to inject, through a nozzle, a composition liquid prepared by dispersing raw materials into a solution, so as to form particulates of the raw materials.

[Aspect 1]

A liquid discharge head (20) includes: a nozzle plate (31) having: a nozzle (30) from which a liquid is to be discharged in a liquid discharge direction; and a nozzle face having the nozzle, the nozzle face directed in the liquid discharge direction; a nozzle protector (23) configured to cover a portion of the nozzle face other than the nozzle; and a channel substrate (32) including: a bonding part bonded to the nozzle protector (23) with an adhesive (55); and a recess (80) in a transverse portion of the bonding part extending in a transverse direction of the liquid discharge head (20), the recess (80) filled with the adhesive (55).

[Aspect 2]

In the liquid discharge head (20) according to Aspect 1, the channel substrate (32): has the recess (80) in the transverse portion; and does not have the recess (80) in a longitudinal portion of the bonding part (36) extending in a longitudinal direction orthogonal to the transverse direction of the liquid discharge head.

[Aspect 3]

In the liquid discharge head (20) according to Aspect 1 or 2, the channel substrate (32) includes a channel communicating with the nozzle (30) to supply the liquid to the nozzle (30), the channel substrate (32) faces a back face of the nozzle plate (31) disposed opposite to the nozzle face of the nozzle plate (31).

[Aspect 4]

In the liquid discharge head according to any one of Aspects 1 through 3, the recess (80) opens outward from the channel substrate (32) at an end face of the channel substrate (32) in the transverse portion.

[Aspect 5]

In the liquid discharge head (20) according to any one of Aspect 1 through 4, the channel substrate (32) has: an end face (320) directed to an outside of the channel substrate (32); and a side face (80*c*) disposed inner side of the end face (320), and the side face (80*c*) is one of side faces defining the recess (80), and the side face (80*c*) is interior of an end face of the nozzle plate (31) in a longitudinal direction orthogonal to the transverse direction of the liquid discharge head (20).

[Aspect 6]

In the liquid discharge head (20) according to any one of Aspects 1 through 4, the channel substrate (32) has: an end face (320) directed to an outside of the channel substrate (32); and a side face (80*c*) disposed inner side of the end face (320), and the side face (80*c*) is one of side faces defining the recess (80), and the side face (80*c*) is aligned with an end face of the nozzle plate (31) in a longitudinal direction orthogonal to the transverse direction of the liquid discharge head (20).

[Aspect 7]

In the liquid discharge head (20) according to any one of Aspects 1 through 6, the recess (80) has a temporary bonding recess (82) filled with an adhesive (57) to temporarily bond the nozzle plate (31) and the channel substrate (32).

[Aspect 8]

A liquid discharge apparatus (100) includes the liquid discharge head according to any one of Aspects 1 through 7.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge head comprising:

a nozzle plate including:

a nozzle from which a liquid is to be discharged in a liquid discharge direction; and a nozzle face having including the nozzle, the nozzle face directed in the liquid discharge direction;

a nozzle protector configured to cover a portion of the nozzle face other than the nozzle; and a channel substrate including:

a bonding part bonded to the nozzle protector with an adhesive; and a recess in a transverse portion of the bonding part extending in a transverse direction of the liquid discharge head, the recess filled with the adhesive, wherein the channel substrate:

includes the recess in the transverse portion; and does not include the recess in a longitudinal portion of the bonding part extending in a longitudinal direction orthogonal to the transverse direction of the liquid discharge head.

2. The liquid discharge head according to claim 1, wherein;

the channel substrate includes a channel communicating with the nozzle to supply the liquid to the nozzle, the channel substrate faces a back face of the nozzle plate disposed opposite to the nozzle face of the nozzle plate.

3. The liquid discharge head according to claim 1, wherein the recess opens outward from the channel substrate at an end face of the channel substrate in the transverse portion.

4. The liquid discharge head according to claim 1, wherein;

the channel substrate includes:

an end face directed to an outside of the channel substrate; and a side face disposed inner side of the end face, and the side face is one of side faces defining the recess, and the side face is interior of an end face of the nozzle plate in a longitudinal direction orthogonal to the transverse direction of the liquid discharge head.

5. The liquid discharge head according to claim 1, wherein:

the channel substrate includes:

an end face directed to an outside of the channel substrate; and a side face disposed inner side of the end face, and the side face is one of side faces defining the recess, and the side face is aligned with an end face of the nozzle plate in the longitudinal direction orthogonal to the transverse direction of the liquid discharge head.

6. The liquid discharge head according to claim 1, wherein the recess includes a temporary bonding recess filled with an adhesive to temporarily bond the nozzle plate and the channel substrate.

7. A liquid discharge apparatus comprising the liquid discharge head according to claim 1.

* * * * *